E. M. LUDLAM.
CATNIP MOUSE.
APPLICATION FILED FEB. 9, 1916.

1,265,926.

Patented May 14, 1918.

Inventor:
Evelyn M. Ludlam
By her attorney, Charles V. Gooding.

UNITED STATES PATENT OFFICE.

EVELYN M. LUDLAM, OF WALTHAM, MASSACHUSETTS.

CATNIP MOUSE.

1,265,926.  Specification of Letters Patent.  Patented May 14, 1918.

Application filed February 9, 1916. Serial No. 77,277.

*To all whom it may concern:*

Be it known that I, EVELYN M. LUDLAM, a citizen of the United States, residing at Waltham, in the county of Middlesex and State of Massachusetts, have invented new and useful Improvements in Catnip Mice, of which the following is a specification.

This invention relates to improvements in animal toys, and more especially to toys suitable for felines.

The invention has for its object to provide a simple, inexpensive toy having a soft, pliable covering or envelop constructed or formed to imitate a mouse or some other similar animal and within which is arranged substances which may have medicinal properties beneficial to felines and also embodying elements having an odor which appeals to the smell of the animal.

Furthermore, the envelop or covering is preferably constructed of destructible material, permitting the same to be destroyed by the animal after it has played with it as it would a real mouse, or chewed it for a while, thereby enabling it to get at the contents or filling material to devour the same.

The invention consists in the combination and arrangement of parts set forth in the following specification and particularly pointed out in the claim.

Referring to the drawings.

Like numerals refer to like parts in both views of the drawings.

Figure 1:
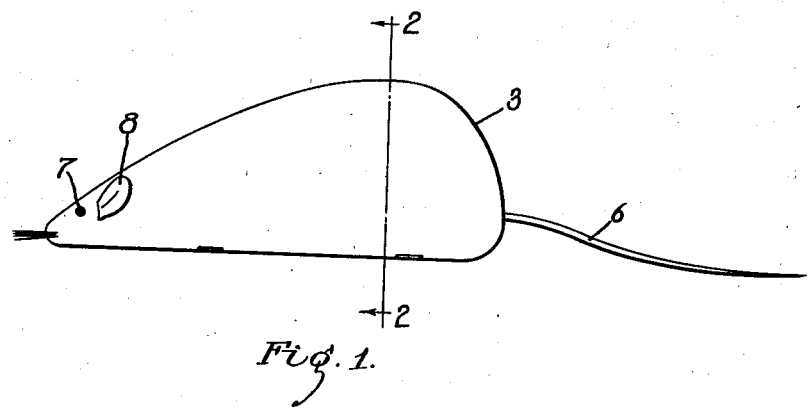
Figure 1 is a side elevation of the preferred embodiment of my invention.

In the drawings, 3 is an envelop or covering, preferably constructed of cloth or other suitable material which is of medium strength and durability and adapted, after being played with, clawed or chewed for a certain period, to be destroyed.

Figure 2:
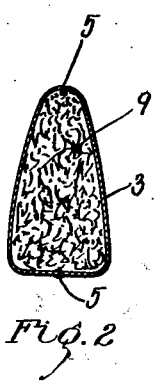
Fig. 2 is a section taken on the line 2—2 of Fig. 1.

The envelop 3 is preferably cut and formed to imitate, as near as possible, some small animal such as a mouse as illustrated in Fig. 1. This envelop is formed from two pieces of material stitched together as at 5, 5, Fig. 2, entirely around the same.

A string or cord 6 imitating a tail is attached to said envelop and beads 7 added thereto to imitate eyes; small pieces of cloth or material similar to that of which the envelop is formed, are cut and attached thereto as at 8 to represent the ears of the animal.

The interior of the envelop 3 is filled with a substance as illustrated at 9 adapted to appeal to the taste and smell of the feline, said filling material including and preferably consisting of catnip, a well known feline remedy. By constructing the envelop of cloth the feline will be able to pick it up with its claws and throw it about, and also chew the same without injury to its teeth until it has destroyed the envelop, permitting the contents to escape and thus be devoured by the animal.

Having thus specifically described my invention what I claim and desire by Letters Patent to secure is:

A device of the class described having, in combination, a pliant destructible cloth envelop substantially of the form of a mouse and a filling therefor including catnip, whereby said cloth envelop is impregnated by said catnip and appeals to the sight, taste, touch and smell of a cat.

In testimony whereof I have hereunto set my hand in presence of two subscribing witnesses.

EVELYN M. LUDLAM.

Witnesses:

CHARLES S. GOODING,
SYDNEY E. TAFT.